United States Patent [19]

Bunch

[11] 4,178,148
[45] Dec. 11, 1979

[54] TOOL FOR FLARING PIPE END PORTIONS

[76] Inventor: Robert E. Bunch, 2754 Arrow Hwy., Sp#22, LaVerne, Calif. 91750

[21] Appl. No.: 935,894

[22] Filed: Aug. 22, 1978

[51] Int. Cl.$^2$ .............................................. B29C 17/02
[52] U.S. Cl. ................................ 425/393; 425/DIG. 5
[58] Field of Search ................ 425/393, 392, DIG. 5, 425/DIG. 41

[56] References Cited

U.S. PATENT DOCUMENTS

| 3,516,302 | 6/1970 | Muttart | 425/DIG. 5 |
|---|---|---|---|
| 3,584,344 | 6/1971 | Bjalme | 425/393 |
| 3,585,687 | 6/1971 | Bjalme | 425/393 X |
| 3,601,852 | 8/1971 | Bjalme | 425/393 |
| 4,108,589 | 8/1978 | Bunch | 425/393 |

Primary Examiner—J. Howard Flint, Jr.
Attorney, Agent, or Firm—Boniard I. Brown

[57] ABSTRACT

Tool apparatus is provided for flaring the end portion of thermoplastic pipes and tubes, and includes a flaring head having a forming recess adapted to receive the pipe end portion and a cam edge portion adjacent to the recess for engaging the pipe end portion in a forming action. Mandrel means are threadedly connected with the flaring head for movement of the head toward the mandrel means about which the pipe being formed is clamped. The forming recess is defined by a frusto-conical surface inclined to the axis of the head in cooperation with an oppositely inclined surface, and the cam edge portion is defined between the frusto-conical surface and a side wall portion of the head. The diameter of the apex of the circular V intersection of the recess-defining surfaces is preferably equal to the outside diameter of the pipe.

17 Claims, 10 Drawing Figures

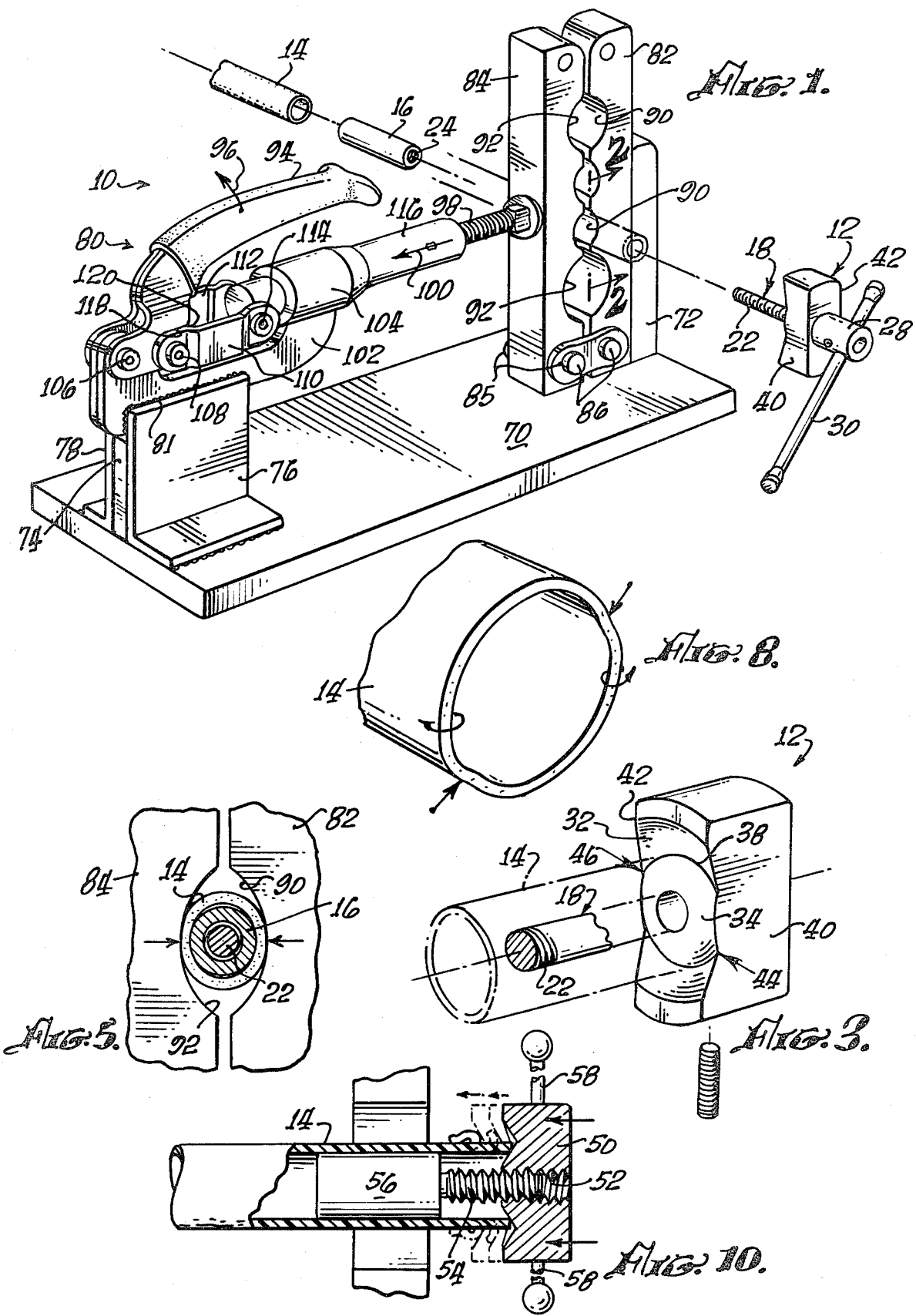

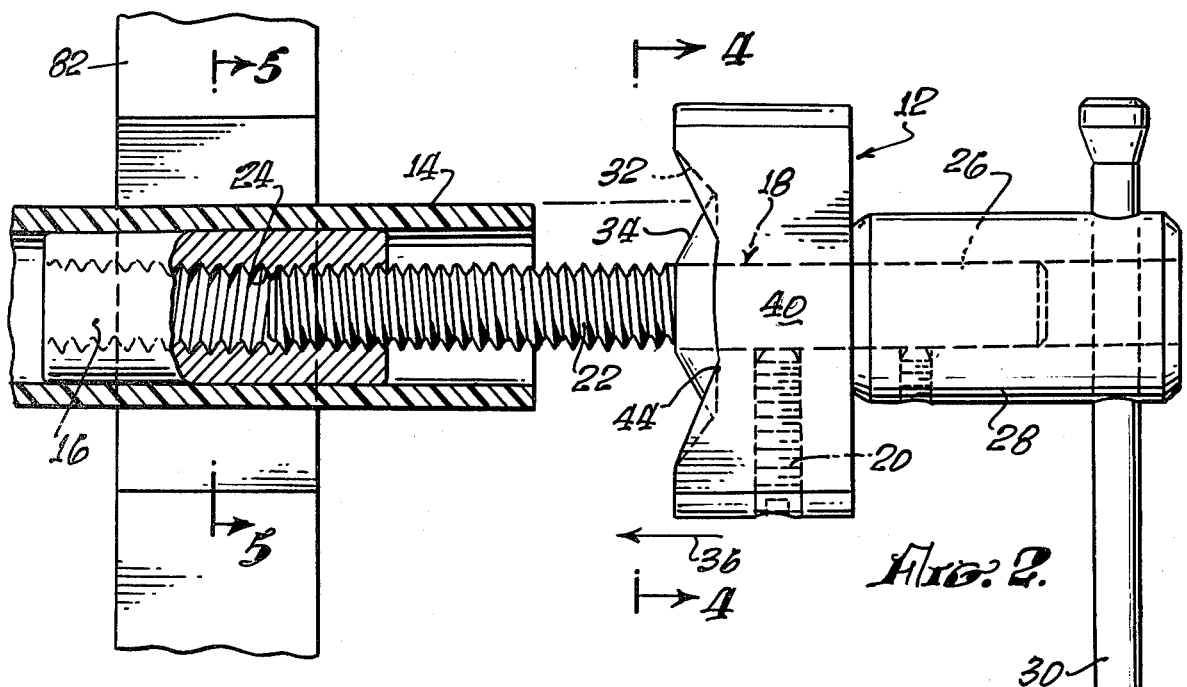
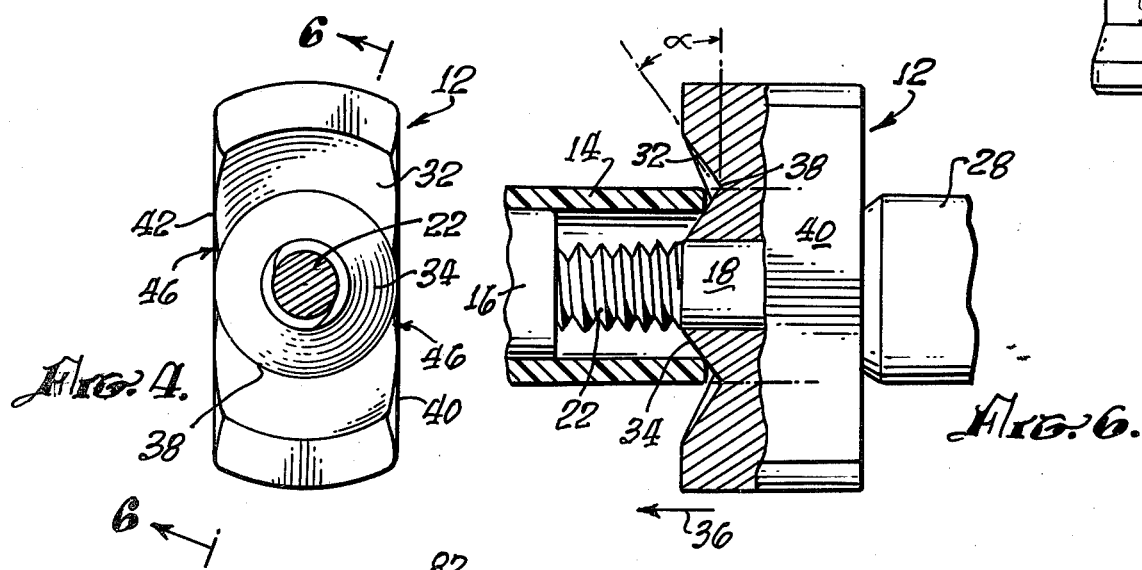
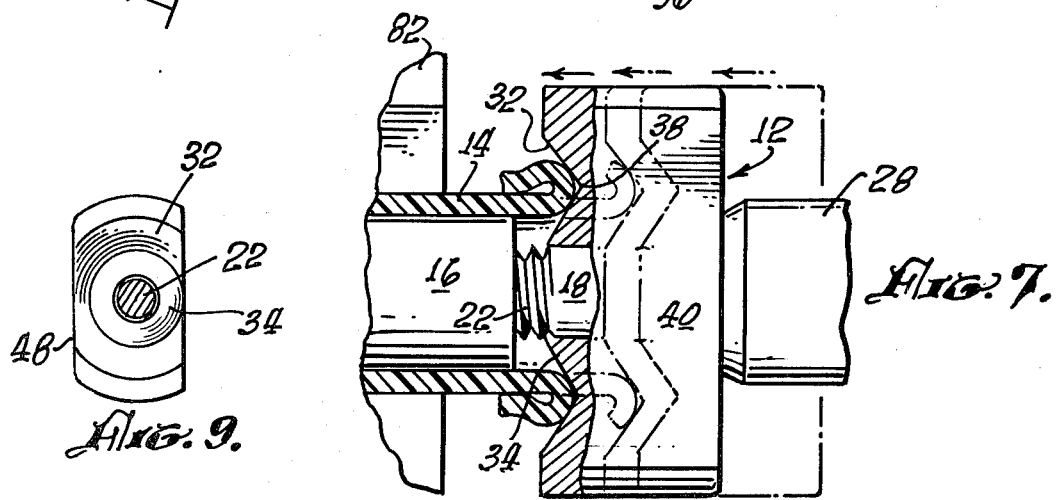

TOOL FOR FLARING PIPE END PORTIONS

BACKGROUND OF THE INVENTION

1. Field of the Invention

This invention relates generally to a tool apparatus for flaring the end portions of thermoplastic pipes and tubes into a doubled-over flare.

2. Prior Art

Various types of flaring tools have been known in the prior art. However, these involve several problems and difficulties in providing proper flaring. My U.S. Pat. No. 4,108,589 contains discussion of prior art. Prior devices require substantial force and inconvenience in flaring, and are incapable of producing a doubled-over flare. The device of my prior patent is capable of producing a doubled-over flared end portion on thermoplastic pipe. Relatively substantial force is required to produce such a doubled-over flare, and power other than manual force is often needed. The clamping force on the plastic pipe is often so great, in order to resist movement of the pipe during the application of considerable forming force, that damage is caused to the pipe. Such damage includes indentation, cracking, and often includes twisting of the pipe end portion, particularly with softer plastic materials or pipe at relatively higher temperatures.

It is therefore an object of the invention to provide a tool forming apparatus for flaring and doubled-over flaring end portions of plastic pipes, which provides more rapid, efficient flaring operation.

An object of the invention is to provide such a tool apparatus which efficiently and readily produces a doubled-over flared pipe end portion.

An object of the invention is to provide such a tool apparatus which greatly reduces or substantially eliminates damage to plastic pipe being flared.

Another object of the invention is to provide such a tool apparatus which reduces the labor and time involved in providing doubled-over flares on plastic pipe end portions.

SUMMARY OF THE INVENTION

The foregoing objects, and other objects and advantages which will become apparent from the foregoing and from the detailed description of the preferred embodiment, are attained in a tool apparatus for flaring plastic pipe end portions and the like, which includes a flaring head with a circular forming recess adapted to receive the pipe end portion, mandrel means threadedly connected with the flaring head for movement of the flaring head against the pipe end portion in a forming direction, with the pipe clamped about the mandrel. The forming recess is preferably defined by oppositely inclined frustro-conical surfaces, and a cam edge portion is defined by a side wall portion of the flaring head in cooperation with the radially outward of the two oppositely inclined surfaces, the cam portion engaging the pipe end portion in a cam flaring action in cooperation with the forming recess. The diameter of the circular intersection of the recess-defining surfaces is preferably equal to the outside diameter of the pipe.

The tool apparatus is capable of conveniently providing doubled-over flared end portions of plastic pipes, utilizing a minimum of time and labor.

DESCRIPTION OF THE DRAWINGS

FIG. 1 is a perspective view of a tool clamp device and a flaring head according to the invention;

FIG. 2 is an elevational view, partially in section, showing a forming head of the invention in operative association with a mandrel and a pipe to be formed;

FIG. 3 is an exploded perspective view of a flaring head according to the invention with portions of associated parts;

FIG. 4 is a sectional view taken at line 4—4 in FIG. 2;

FIG. 5 is a fragmentary sectional view taken at line 5—5 in FIG. 2;

FIG. 6 is a partial elevational view of the flaring head in engagement with an end portion of a pipe to be flared;

FIG. 7 is a partial sectional view, showing the flaring head forming a doubled-over flare on a pipe end portion;

FIG. 8 is a perspective view of an end portion of plastic pipe being formed, showing initial deformation of the pipe end portion by the flaring head;

FIG. 9 is a sectional view, similar to the view of FIG. 4, showing a modified form of flaring head; and FIG. 10 is an elevational sectional view, showing a modified form of flaring head and mandrel arrangement according to the invention.

DESCRIPTION OF THE PREFERRED EMBODIMENT

Referring to the drawings, and more particularly to FIGS. 1 through 4, there are shown a clamping-tool device 10 and a flaring head 12, according to the invention, operatively arranged for flaring an end portion of a plastic pipe 14. A mandrel 16 is positioned within the pipe and the pipe is clamped firmly thereabout in the manner just indicated in FIG. 5, thus to prevent relative axial and rotational movement between the pipe and the mandrel during the flaring operation on the pipe. The clamping tool device 10 and its operation are later described. The mandrel fits closely within the tube to facilitate firm clamping. A shaft 18 is secured in an axial opening in the flaring head 12 by a set screw 20, and has a threaded portion or neck 22 in engagement with a threaded axial opening 24 of the mandrel. A mounting portion 26 of the shaft extends oppositely from the head and secured thereto by an appropriate set screw is a fitting 28 through which extends a handle 30 for application of turning or flaring force. A free end portion of the pipe to be flared extends outwardly from the clamped portion to a distance determined by the pipe size and the nature of the flare to be formed.

Referring to FIGS. 3, 4 and 6, the flaring head has a forming recess defined by sections or portions of surfaces of revolution or frustro-conical surfaces, a radially outward surface or surfaces 32 and a radially inward surface 34. The two surfaces are oppositely inclined, surface 32 being inclined radially outward in the forming direction in which the flaring head is urged against the pipe end portion, this direction being indicated by arrows 36 in FIGS. 2 and 6, while the inward surface 34 is inclined radially inwardly in the forming direction 36. Surfaces 32, 34 thus intersect to define a forming recess of a "V" cross-sectional configuration having a circular intersection of the surfaces or apex 38. It is considered important that the diameter of the circular intersection thus defined be substantially equal to the outside diameter of the pipe to be flared, for proper double-flaring or doubled-over flaring of the tube end portion by the flaring head of the invention. In the preferred embodiment shown, the surfaces of revolution 32, 34, are intersected by side surfaces 40, 42 of the head, these side surfaces being spaced apart a distance which is somewhat less than the outside diameter of the pipe and the circular intersection 38 of the recess-defining surfaces 32, 34, in the preferred embodiment of the invention.

The intersections of the side surfaces 40, 42 with the recess-defining surfaces 32, 34 define cam edge portions 44, 46 at the respective sides of the forming head, as indicated in FIG. 3. The surface intersections, particularly the cam edge portions 44, 46 are provided with a degree of beveling in order to prevent cutting into or galling of the end edge of the pipe to be formed, which otherwise would occur with a sharp edge or corner.

FIG. 9 illustrates a modified form of flaring head wherein the distance between the side surfaces of the head is greater than the distance in the form illustrated in FIGS. 3 and 4, and wherein a side surface intersects the recess-defining surfaces outwardly of the inward surface 32, so that no cam edge portion is defined, there being only a single cam edge portion at the opposite side of the head. The form of the head having two cam edge portions defined by the side walls intersecting the recess-defining surfaces, as indicated in FIGS. 3 and 4, is preferable in that this form provides more efficient, more convenient, and more rapid flaring of the pipe.

The outward recess-defining surface 32 preferably is inclined at an angle α of 23° from the axial direction, or greater, in accordance with the pipe material and the type of pipe flaring to be provided. The inclination of the inward surface 32 is preferably similar, but is not as of great significance as the inclination of the outward surface.

It is considered important that the appropriate combination of inclination of the outward surface 32 and the substantially similar dimensions of the pipe outside diameter and the diameter of the circular intersection or apex 38 of the recess-defining surfaces 32, 34, be provided in order that the pipe end portion will be forced back upon itself into a doubled-over or "double flare" configuration, as hereinafter discussed. Otherwise, the end portion of the pipe flares continuously outwardly during forming, without such doubling back.

In the operation of the flaring head, the flaring head is urged in the forming direction of arrows 36, (FIGS. 2, 6, 7), by operation of handle 30 to rotate the head and its threaded shaft portion 22 relative to the threaded opening of the stationary mandrel 16, thus urging the end portion of the pipe into the forming recess of the head, as shown in FIG. 6. The cam edge portions 44, 46, being spaced from the rotational axis a distance somewhat less than the radius of inward surface 34, engage the end edge portion of the pipe and serve as cam edges or leading edges to initially and continuously effect a forming or rolling action on the pipe material, this camming deformation of the pipe end portion being indicated in FIG. 8. The cam edge portions 44, 46 serve in effect as wedges to continuously act on the pipe end portion to cam outwardly or roll the tube wall outwardly in a flaring or rolling action, in cooperation with the forming recess and surfaces 32, 34 which continuously apply the forming or flaring force, as the head is urged in the forming direction against the pipe end portion. The tube end portion is thus caused to double over or double back into a U configuration. The desired doubled-over or "double flare" pipe end portion is thus formed, in order to provide relatively stronger joints and more positive sealing of fluid connections than is possible with merely outwardly-flared pipe end portions.

FIG. 10 illustrates a modified form of flaring head and mandrel arrangement, wherein a head 50 has a threaded axial bore 52 which engages a threaded extension or shaft portion 54 of a mandrel 56, the head being rotated by handles 58 on the head. This embodiment is otherwise similar to that above described.

Considering the preferred form of clamping tool device 10 of FIG. 1 in detail, this device is like that shown and described in my U.S. Pat. No. 4,108,589. The device has a base member 70 which at the opposite ends thereof includes upstanding support portions 72 and 74. Ears 76, 78 extend along the portion 74 to attach the clamp 80 therebetween by means of welds 81. The opposite upstanding portion 72 provides rear support for a pair of clamping bars 82 and 84 with the back surface 84 of bar 82 being in abutment with the front facing surface 86 of the portion 72. The bars 82, 84 are hingedly connected by a pair of oppositely disposed link bars 85 and suitable fastening pins 86. It is preferable that the fastening pins be removable. Therefore the link bars 84 can be moved with respect to the bars 82, 84 so that the leverage thereabout can be adjustment from end to end thereof. For this purpose holes 88 are provided at the ends of the bars 82, 84 opposite from the end in which the pins 86 are inserted.

Each of bars 82, 84 includes a plurality of notches 90, 92, respectively. The notches have arcuate, non-semicircular walls, such that when the two bars 82, 84 are urged together about a pipe 14, they engage the pipe as would an oval, elliptical, or eccentric configuration. The pipe 14 shown both in an engaged and unengaged position is retained between the bars by the clamp 80.

The clamp 80 includes a lever 94 movable in the direction of arrow 96 to move the adjustable leg 98 in the direction shown by arrow 100 to disengage the bars 82 and 84, or in the opposite directions to clamp on a pipe 14. This action occurs because the clamp includes a C-shaped member 102 permanently connected to the ears 26, 28, which at one end includes a sleeve 104 and at the opposite end provides for pivotal connection of the lever 94 by means of pivot 106. As the lever is moved in the direction opposite from arrow 96, a second pivot 108 thereof is moved in a circular direction about pivot 106 so that its net linear effect is toward the sleeve 104. The pivot 108 is connected by means of a pair of links 110 and 112 and by a pivot 114 to a shaft member 116 which is mounted to slide axially in the sleeve 104. The adjustable arm 98 is threadably mounted in the barrel member 116. The threaded connection provides the length adjustment for the arm 98 so that the desired force can be established on the pipe 14 by bars 82 and 84 when the lever 94 is manually operated. When the lever is rotated as far as possible downwardly and the arm 98 is properly adjusted, an appropriate force is brought to bear upon the pipe. The downward movement of the lever is restricted by abutment surfaces 118, one being shown, which bear on mating abutment surfaces 120 on links 110 and 112. The surfaces 118 and 120 are so arranged with respect to the pivots 106 and 108 that pivot 108 goes through alignment and below a line from pivot 106 to pivot 114 just before the surfaces 118 and 120 come into abutment. This overcenter action causes the lever 94 to remain in a closed position retaining the pipe between the bars 82, 84.

The inventor claims:

1. Tool apparatus for flaring the end portion of a plastic pipe and the like, comprising:
    a flaring head having a circular forming recess confronting and adapted to receive the pipe end portion and having a cam edge portion adjacent to the forming recess to engage and deform the pipe end portion,
    mandrel means threadedly connected with the flaring head for movement of the flaring head toward the mandrel means in a forming directions, and
    means mounting the mandrel means and the pipe end portion in clamped relation to prevent relative movement therebetween.

2. A tool apparatus according to claim 1, wherein:
    said forming recess is of V-configuration in cross section and is defined by a frustro-conical surface inclined radially outwardly in the forming direction in cooperation with an oppositely inclined surface of the head.

3. A tool apparatus according to claim 2, wherein:
    the forming recess is defined by oppositely inclined frustro-conical surfaces and said cam edge portion is defined by said frustro-conical surface and a side wall portion of the flaring head.

4. A tool apparatus according to claim 1, wherein:
    said forming recess is defined by oppositely inclined surfaces of revolution, one surface being inclined radially outwardly and the other surface being inclined radially inwardly in said forming direction.

5. A tool apparatus according to claim 1 or claim 2 or claim 3 or claim 4, wherein:
    the diameter of the apex of said V cross sectional configuration of the forming recess is substantially equal to the outside diameter of said pipe.

6. A tool apparatus according to claim 1 or claim 3 or claim 4, wherein said mounting means comprises:
    a base having an upstanding wall surface,
    a first bar member adapted to engage said upstanding wall surface and having at least one transverse notch disposed therein,
    a second bar member hingedly connected to one end of said first bar member and having at least one matching notch to correspond to the notch in said first bar member,
    removable hinge means capable of hingedly connecting either desired adjacent ends of each bar members, whereby said second bar member is adapted to be removably superposed over said first bar member, and
    clamping means affixed to said base and positioned to bear against said second bar member for releasable engagement with the first bar member thereof.

7. A tool apparatus according to claim 1 or claim 3 or claim 4, wherein said mounting means comprises:
    a base operatively associated with said mandrel and flaring head and having an upstanding wall surface,
    a first bar member engaging said upstanding wall surface,
    a second bar member hingedly connected to one end of said first bar member,
    removable hinge means operatively associated with said bar members and capable of hingedly connecting either desired pair of adjacent ends of said bar members, whereby said second bar member is adapted to be removably engaged with said first bar member, and
    clamping means having an overcenter closure maintaining mechanism affixed to said base positioned to bear against said second bar member at a midpoint therealong for releasable engagement thereof with the first bar member, each of said bar members including a plurality of matching transverse notches disposed therein to form pairs which have predetermined non-semicircular arcuate walls sized to accommodate particular size pipes therebetween and to provide positive engagement between said notches and a plastic pipe arranged therein, whereby said mandrel means disposed in said pipe is held from rotational and longitudinal movement by compression of said pipe thereon by a pair of said notches.

8. A tool apparatus according to claim 1 or claim 2 or claim 3 or claim 4 wherein said mounting means comprises:
    a base having an upstanding member thereon,
    a first bar member having a plurality of various size transverse notches disposed therein and positioned to be restrained in a single direction by said upstanding member,
    a second movable bar member hingedly connected to said first bar member and having a plurality of transverse notches arranged to correspond to each of said notches in said first bar member, wherein each of said notches include an arcuate-bar member, wherein each of said notches include an arcuate non-semicircular wall forming an elliptical opening between respective corresponding notches to provide a positive engagement with the tubing disposed therein,
    hinge means hingedly connecting adjacent ends of said bar members, whereby said second bar member is allowed to move relative to said first fixed bar member,
    clamping means affixed to said base positioned to bear against said second movable bar member in said single direction, and
    a mandrel having a threaded neck member formed thereon of a length longer than the diameter of the tubing.

9. A tool apparatus according to claim 2, wherein:
    the diameter of the apex of said V cross sectional configuration of the forming recess is substantially equal to the outside diameter of said pipe, and wherein said mounting means comprises a base having an upstanding wall surface,
    a first bar member adapted to engage said upstanding wall surface and having at least one transverse notch disposed therein,
    a second bar member hingedly connected to one end of said first bar member and having at least one matching notch to correspond to the notch in said first bar member,
    removable hinge means capable of hingedly connecting either desired adjacent ends of each bar members, whereby said second bar member is adapted to be removably superposed over said first bar member, and
    clamping means affixed to said base and positioned to bear against said second bar member for releasable engagement with the first bar member thereof.

10. A tool apparatus according to claim 3, wherein:

the diameter of the apex of said V cross sectional configuration of the forming recess is substantially equal to the outside diameter of said pipe, and wherein said mounting means comprises a base having an upstanding wall surface, a first bar member adapted to engage said upstanding wall surface and having at least one transverse notch disposed therein, a second bar member hingedly connected to one end of said first bar member and having at least one matching notch to correspond to the notch in said first bar member, removable hinge means capable of hingedly connecting either desired adjacent ends of each bar members, whereby said second bar member is adapted to be removably superposed over said first bar member, and clamping means affixed to said base and positioned to bear against said second bar member for releasable engagement with the first bar member thereof.

11. A tool apparatus according to claim 4, wherein:

the diameter of the apex of said V cross sectional configuration of the forming recess is substantially equal to the outside diameter of said pipe, and wherein said mounting means comprises a base having an upstanding wall surface, a first bar member adapted to engage said upstanding wall surface and having at least one transverse notch disposed therein, a second bar member hingedly connected to one end of said first bar member and having at least one matching notch to correspond to the notch in said first bar member, removable hinge means capable of hingedly connecting either desired adjacent ends of each bar members, whereby said second bar member is adapted to be removably superposed over said first bar member, and clamping means affixed to said base and positioned to bear against said second bar member for releasable engagement with the first bar member thereof.

12. A tool apparatus according to claim 2, wherein:

the diameter of the apex of said V cross sectional configuration of the forming recess is substantially equal to the outside diameter of said pipe, and wherein said mounting means comprises a base operatively associated with said mandrel and flaring head and having an upstanding wall surface, a first bar member engaging said upstanding wall surface, a second bar member hingedly connected to one end of said first bar member, removable hinge means operatively associated with said bar members and capable of hingedly connecting either desired pair of adjacent ends of said bar members, whereby said second bar member is adapted to be removably engaged with said first bar member, and clamping means having an overcenter closure maintaining mechanism affixed to said base positioned to bear against said second bar member at a midpoint therealong for releasable engagement thereof with the first bar member, each of said bar members including a plurality of matching transverse notches disposed therein to form pairs which have predetermined non-semicircular arcuate walls sized to accommodate particular size pipes therebetween and to provide positive engagement between said notches and a plastic pipe arranged therein, whereby said mandrel means disposed in said pipe is held from rotational and longitudinal movement by compression of said pipe thereon by a pair of said notches.

13. A tool apparatus according to claim 3, wherein:

the diameter of the apex of said V said sectional configuration of the forming recess is substantially equal to the outside diameter of said pipe, and wherein said mounting means comprises a base operatively associated with said mandrel and flaring head and having an upstanding wall surface, a first bar member engaging said upstanding wall surface, a second bar member hingedly connected to one end of said first bar member, removable hinge means operatively associated with said bar members and capable of hingedly connecting either desired pair of adjacent ends of said bar members, whereby said second bar member is adapted to be removably engaged with said first bar member, and clamping means having an overcenter closure maintaining mechanism affixed to said base positioned to bear against said second bar member at a midpoint therealong for releasable engagement thereof with the first bar member, each of said bar members including a plurality of matching transverse notches disposed therein to form pairs which have predetermined non-semicircular arcuate walls sized to accommodate particular size pipes therebetween and to provide positive engagement between said notches and a plastic pipe arranged therein, whereby said mandrel means disposed in said pipe is held from rotational and longitudinal movement by compression of said pipe thereon by a pair of said notches.

14. A tool apparatus according to claim 4, wherein:

the diameter of the apex of said V cross sectional configuration of the forming recess is substantially equal to the outside diameter of said pipe, and wherein said mounting means comprises a base operatively associated with said mandrel and flaring head and having an upstanding wall surface, a first bar member engaging said upstanding wall surface, a second bar member hingedly connected to one end of said first bar member, removable hinge means operatively associated with said bar members and capable of hingedly connecting either desired pair of adjacent ends of said bar members, whereby said second bar member is adapted to be removably engaged with said first bar member, and clamping means having an overcenter closure maintaining mechanism affixed to said base positioned to bear against said second bar member at a midpoint therealong for releasable engagement thereof with the first bar member, each of said bar members including a plurality of matching transverse notches disposed therein to form pairs which have predetermined non-semicircular arcuate walls sized to accommodate particular size pipes therebetween and to provide positive engagement between said notches and a plastic pipe arranged therein, whereby said mandrel means disposed in said pipe is held from rotational and longitudinal movement by compression of said pipe thereon by a pair of said notches.

15. A tool apparatus according to claim 2, wherein:

the diameter of the apex of said V cross sectional configuration of the forming recess is substantially equal to the outside diameter of said pipe, and wherein said mounting means comprises a base having an upstanding member thereon, a first bar member having a plurality of various size transverse notches disposed therein and positioned to be restrained in a single direction by said upstanding member, a second movable bar member hingedly connected to said first bar member and having a plurality of transverse notches arranged to correspond to each of said notches in said first bar member, wherein each of said notches include an arcuate-bar member, wherein each of said notches include an arcuate non-semicircular wall forming an elliptical opening between respective corresponding notches to provide a positive engagement with the tubing disposed therein, hinge means hingedly connecting adjacent ends of said bar members, whereby said second bar member is allowed to move relative to said first fixed bar member, clamping means affixed to said base positioned to bear against said second movable bar member in said single direction, and a mandrel having a threaded neck member formed thereon of a length longer than the diameter of the tubing.

16. A tool apparatus according to claim 3, wherein:

the diameter of the apex of said V cross sectional configuration of the forming recess is substantially equal to the outside diameter of said pipe, and wherein said mounting means comprises a base having an upstanding member thereon, a first bar member having a plurality of various size transverse notches disposed therein and positioned to be restrained in a single direction by said upstanding member, a second movable bar member hingedly connected to said first bar member and having a plurality of transverse notches arranged to correspond to each of said notches in said first bar member, wherein each of said notches include an arcuate-bar member, wherein each of said notches include an arcuate non-semicircular wall forming an elliptical opening between respective corresponding notches to provide a positive engagement with the tubing disposed therein, hinge means hingedly connecting adjacent ends of said bar members, whereby said second bar member is allowed to move relative to said first fixed bar member, clamping means affixed to said base positioned to bear against said second movable bar member in said single direction, and a mandrel having a threaded neck member formed thereon of a length longer than the diameter of the tubing.

17. A tool apparatus according to claim 4, wherein:

the diameter of the apex of said V cross sectional configuration of the forming recess is substantially equal to the outside diameter of said pipe, and wherein said mounting means comprises a base having an upstanding member thereon, a first bar member having a plurality of various size transverse notches disposed therein and positioned to be restrained in a single direction by said upstanding member, a second movable bar member hingedly connected to said first bar member and having a plurality of transverse notches arranged to correspond to each of said notches in said first bar member, wherein each of said notches include an arcuate-bar member, wherein each of said notches include an arcuate non-semicircular wall forming an elliptical opening between respective corresponding notches to provide a positive engagement with the tubing disposed therein, hinge means hingedly connecting adjacent ends of said bar members, whereby said second bar member is allowed to move relative to said first fixed bar member, clamping means affixed to said base positioned to bear against said second movable bar member in said single direction, and a mandrel having a threaded neck member formed thereon of a length longer than the diameter of the tubing.

* * * * *